United States Patent Office 3,240,663
Patented Mar. 15, 1966

3,240,663
METHOD OF PREPARING PAPER FROM MICA FLAKES AND A SILICONE
Thaddeus A. Raczek, Sanford, Mich., assignor to Dow Corning Corporation, Midland, Mich., a corporation of Michigan
No Drawing. Filed Oct. 1, 1962, Ser. No. 227,586
1 Claim. (Cl. 162—152)

This invention relates to a method for making sheets from sheetable particles and a silicone binder.

The excellent thermal and electrical properties of silicone resin impregnated asbestos and glass molded articles is well known. To date they have found wide use in the electrical industry and in many structural applications. It is also well known that silicone molded articles are expensive and this has restricted their use in spite of the excellent properties. One reason for the expense of such molded articles is the fact that they have heretofore been made by impregnating particulated materials or fabrics with an organic solvent solution of an organopolysiloxane which has undergone considerable processing in order to get it into a form considered suitable for molding purposes. This extensive processing increases the cost of the resin.

Another reason for the expense of silicone impregnated molded articles has been the extra processing necessitated by the use of organic solvent systems. This meant that the impregnated fibers were extremely sticky and hard to handle unless they were B-stage cured by removing the solvent from the silicone. This necessitated the making of the paper first, then impregnating the paper in a solvent solution of the silicone, and removing the volatiles from the silicone impregnated paper by the use of a heating apparatus. Only then would the silicon be in a non-tacky, B-stage cured state and easy to handle. This separate impregnating step increased the total processing cost.

Prior to this invention it was not known how to prepare silicone impregnated paper on a standard paper making machine such as the Fourdrinier or cylinder machines at high resin content. In fact it was considered impossible to do so because of the well known sticky character of uncured silicone resins. This it was said would cause agglomeration of the fibers in the equipment and prevent sheeting out of the paper on the wire or rolls.

Applicant has invented a way of employing silicone resins in the commercial paper making process and has thereby provided a novel and economical way of producing silicone impregnated paper which can be subsequently molded into articles of any desired shape and thickness. This method can be employed on standard paper making machines and thus greatly reduces the cost of silicone molded articles.

It is an object of this invention to develop a process for preparing paper using a silicone binder. It is an object to develop such a process which does not require the use of an organic solvent. In particular, it is an object to develop a process to prepare a silicone-asbestos paper. It is a further object to develop a process to prepare structural tubes, in particular silicone-asbestos tubes.

These objects are obtained by (1) mixing a sheetable particulated material with a water solution of an organosilicon composition, said organosilicon composition consisting essentially of from 70 to 100 mol percent $C_6H_5SiΞ$ units, essentially all of any remaining organosilyl units being selected from the group consisting of $(C_6H_5)(CH_3)Si=$ and $(CH_3)_2Si=$ units, essentially all the remaining valences of the silicon atoms in said composition being satisfied by oxygen atoms of a configuration selected from the group consisting of OH groups and SiOSi linkages, the pH of the aqueous solution during at least a substantial portion of the period of contact with the sheetable particles being such that at least 5 percent by weight based on the weight of the sheetable particles of the organosilicon composition in the solution is deposited onto the sheetable particles, (2) allowing said coated particles to stand without agitation for a time sufficient that they will not coagulate when they are agitated and thereafter, (3) separating the particles from the water in such a manner so that the particles are bound together to form a sheet.

The aqueous solution of the organosilicon composition can be prepared in any convenient manner. The best method for preparing this organosilicon solution is to mix the appropriate methoxysilane with more than one mol of water per mol of methoxy group in the silane. Preferably, the amount of water is 40 or more mols of water per mol of methoxy group in the silane. The mixture is then agitated until the homogeneous solution is obtained. The solution can be diluted with water to give the desired concentration of the organosilicon compositions. In order to facilitate the hydrolysis of the methoxysilanes, it is desirable to employ a mild hydrolysis catalyst such as an acid such as acetic, propionic or the like. In general, it is sufficient to employ about 0.1 percent acid based on the weight of the water.

The aqueous solution can also be prepared by the hydrolysis of any corresponding hydrolyzable silane such as other alkoxysilane such as ethoxy or isopropoxy silanes, or the corresponding acetoxy silanes. In the latter case, it is often desirable to buffer the hydrolyzate solution to reduce the acidity thereof. This aqueous solution of organosilicon composition can also be prepared by other methods.

The organosilicon compositions in this aqueous solution are organosilanols or organosiloxanols which are soluble in water. They are also soluble in mixtures of water with water-miscible solvents such as methanol, ethanol, dioxane and the like. The degree of condensation of the organosilicon compound in aqueous solution is quite low. Because of the low degree of condensation, most of the polymerization of the siloxane takes place after it has been applied to the sheetable particles.

From 70 to 100 mol percent of the organosilyl units in the organosilicon composition are of the unit formula $(C_6H_5)SiΞ$. Essentially all of the remaining valences of silicon in the formula are satisfied by oxygen atoms. From 0 to 30 mol percent of the organosilyl units are either of the formula $(C_6H_5)(CH_3)Si=$ or of the formula $(CH_3)_2Si=$. The remaining valences of silicon in these formulae are also satisfied by oxygen atoms. The oxygen atoms in the organosilicon composition are present in the form of $ΞSiOSiΞ$ linkage and in silicon-bonded hydroxyl radicals. When a high degree of flexibility is desired in the sheets it is preferable to incorporate up to 30 mol percent of the $(C_6H_5)(CH_3)Si=$ or $(CH_3)_2Si=$ units. Sheets made from 100 mol percent $(C_6H_5)SiΞ$ units are somewhat less flexible and, hence, are very useful for structural members.

If it is desired to incorporate more than 30 mol percent diorganosilyl compositions in the sheet material one can do so by first coating the particles to be sheeted with a low molecular weight phenylmethyl-siloxanol and thereafter contacting the coated particles or fibers with the aqueous solution of this invention. By this method one can produce cured sheets which are even more flexible than those obtained by incorporating 30 mol percent $(CH_3)_2Si=$ or $(C_6H_5)(CH_3)Si=$ in the aqueous solution as shown above. By first coating the particles with phenylmethylsiloxane one can obtain sheets or paper containing up to 60 mol percent diorganosiloxane.

Sheetable particles are particles which are suitable for making sheets. The particles can be fibrous, flakes or other types of small particles. Inorganic sheetable particles, such as mica flakes, flake aluminum, asbestos fibers, glass fibers and quartz fibers can be used. Organic sheetable particles, such as nylon, Dacron and Orlon fibers and alpha-cellulose pulp can be used. Obviously, the thickness of the sheets is dependent upon the diameter of the sheetable particles and the processing variables. The length of the sheetable particles may range from about .01 to 1 inch. Since the process of this invention is most efficiently practiced on a paper machine, it is preferred that fibers less than ¼ of an inch in length be used. Longer fibers tend to clog the feeding operation of the paper machine. Fibers, in particular asbestos fibers, are the preferred sheetable particles.

The process of this invention is carried out by contacting the sheetable particles with the previously defined aqueous solution of an organosilicon composition. It is preferable to first prepare the homogeneous solution of the organosilicon composition and then to add this solution to a slurry of the sheetable particles. However, the fibers can be added directly to the homogeneous solution and additional water added if desired. Alternatively, the homogeneous solution can be prepared in situ by adding the silanes directly to a slurry of the sheetable particles with sufficient agitation and catalyst to obtain the homogeneous solution.

The concentration of organosilicon compound in the solution is not critical so long as there is sufficient dissolved compound to deposit at least 5 percent by weight siloxane on the sheetable particles. In practice, the silicone solution and sheetable material are mixed in a suitable container, the pH is adjusted to cause deposition of the siloxane and the coated particles are allowed to stand until they will no longer coagulate when agitated. The slurry can then be redispersed and diluted further if desired and then placed on the screen of a Fourdrinier machine or on the screen roll of a cylinder machine. On these screens the water is removed and the material formed into a sheet in the conventional manner.

In carrying out these various operations the concentration of total organosilicon compound and sheetable material in the slurry can range from 1 to 10 percent or more during the deposition step. Generally, the slurry is diluted to a concentration of one percent or less total organosilicon compound and sheetable particles before it is placed on the screen of the Fourdrinier or cylinder machine.

In the process of this invention the amount of siloxane deposited on the filler particles can vary widely. When the paper is to be used to make laminated articles the total pickup of siloxane should be at least 15 percent by weight of the sheetable material. The optimum amount varies depending upon the nature of the filler. Thus, for example, with relatively course materials such as glass fibers or mica flakes, the optimum amount is about 35 to 40 percent while with finer materials such as asbestos fibers, the best pickup is in the range of from 50 to 150 percent of the weight of the asbestos.

The pH of the aqueous solution during at least a substantial portion of the period of contact with the sheetable particles must be such that at least a substantial portion of the organosilicon composition in the solution is deposited onto the sheetable particles. The exact pH required is dependent upon a variety of factors, such as the organosilicon composition used, concentration of particles and organosilicon solids, the type of sheetable particle and the time allocated to carrying out this step. A longer period of contact must be used if the pH is below 6.5 than with a higher pH. In general, the higher the pH, the less time required to obtain the desired pickup. The process is more efficient at a higher pH because more of the organosilicon solids are deposited onto the particles. If any of the organosilicon solids are left in the solution after being separated from the sheetable particles, the aqueous solution can be reused. If necessary, an additional amount of silanes can be added to the solution to obtain the desired organosilicon solids concentration.

In general, a pH above 7.5 is preferred. For commercial operation, a pH of between 8 and 9 is desired. Since the homogeneous solution is usually slightly acid, it is generally necessary to add alkali to raise the pH to the desired point. When untreated asbestos fibers are used, it is generally not necessary to add extra alkali because the alkali leached from the asbestos fibers is usually sufficient. When untreated asbestos fibers are used without the addition of alkali, the pH of the solution gradually increases as the alkali is leached from the asbestos. In this case the pH necessary for deposition of the fibers is not obtained until near the end of the period of contact. Additional alkali can be added if a faster deposition is desired.

It is essential that the particles and solution not be agitated during the stage that the sheetable particles coagulate upon agitation. In other words, the coated particles must not be agitated until the organosilicon coating on the particles has reached a non-coalescing stage. This stage usually starts after a substantial portion of the organosilicon solids have been deposited on the fibers. The duration of the stage depends upon the rapidity of condensation of the organosilicon solids. If agitation is used during the coalescing stage, the fibers coagulate to form a mass which is extremely difficult or impossible to lay down as a sheet. After the organosilicon solids have reached the non-coalescing stage they can be agitated if desired. A simple test to determine when the organosilicon coated particles have reached the non-coagulating stage is to remove a small sample of the slurry and shake it and observe the action of the particles. If they stick together in lumps instead dispersing evenly, the slurry must be allowed to stand longer to allow the organosilicon composition to reach the non-coalescing stage. If the test sample disperses upon shaking without forming lumps the particles are ready to be sheeted out. Agitation is usually desired at this stage in order to redisperse the fibers prior to forming the sheet.

In order to prepare the sheet material, it is necessary to separate the particles from the aqueous solution in such a manner that the particles are bound together to form a sheet. This can be accomplished on a hand sheet machine by depositing the solution and fibers onto the wire screen and allowing the solution to drain through the wire screen. A partial vacuum can be used to aid in the liquid removal and sheet formation.

However, sheets can best be prepared on a commercial paper machine such as those of the Fourdrinier or cylinder type. On machines of the Fourdrinier type, the solution and fibers are run evenly onto the surface of a moving endless belt of wire cloth through which the excess liquid is drained. A portion of the liquid is drained off by gravity, another portion is removed by suction and the remainder is removed by the application of pressure. Sheets can also be prepared on a cylinder paper machine, the solution and fibers being added to the tank and picked up on the wire of the cylinder with the liquid being removed through the center of the cylinder. On both the Fourdrinier and the cylinder paper machine, the sheets pass between pressure rolls to squeeze out more water and consolidate the sheets. This is normally achieved by running the paper off the wire screen through felt presses. At this stage the sheet normally contains about 20 percent water. The remainder of the water is removed by passing the sheet through drying rolls or a drying oven. The sheets may range from smooth ultra thin sheets and films thinner than tissue to relatively thick opaque sheets and films.

The process of this invention is especially useful for making tubes. These tubes can be prepared from either wet or dry paper as desired, that is the sheet can be taken directly from the felt presses and wound on a heated mandrel to remove the water and consolidate the various layers in one step. Alternatively, the paper can first be dried on the rolls or drying oven before wrapping on the mandrel. These tubes can be of any desired shape or thickness and can be formed by a continuous process by running the paper from the paper machine directly onto the tube forming mandrel. The asbestos fibers are especially useful in the preparation of such tubes which are especially useful as cores in dry type transformers.

The sheets prepared in accordance with this invention can be press-molded together to form laminates. The properties of the laminates are often improved by subjecting them to additional curing after molding. These laminates are especially useful as thermal and electrical insulation. The sheets can be chopped into proper size and then press-molded to make a molded article which is also useful as thermal and electrical insulation. The sheets which contain a high proportion of phenylmethyl and/or dimethylsiloxane can be used as electrical insulating tapes.

The following examples are illustrative only and should not be construed as limiting the invention which is properly delineated in the appended claims.

Unless otherwise stated, the post-cure was obtained by heating the sample for 16 hours at 90° C. and increasing the temperature 16° C. per hour until 250° C. was reached. The temperature was maintained at 250° C. for the time stated in the examples. Flexual strength was measured in accordance with ASTM D–790. Volume and surface resistivity were measured in accordance with ASTM D–257–58. Dielectric strength was measured in accordance with ASTM D–149–59. The dielectric constants and the dissipation factors were determined in accordance with ASTM 150–54T. Condition A indicates that the sample was tested as made and condition D indicates that prior to testing the sample was immersed in water at a temperature and for the time stated.

EXAMPLE 1

Monophenyltrimethoxysilane (600 g.) was added to 165 g. water which contained 0.3 g. acetic acid. After 30 minutes of agitation the solution become homogeneous. Canadian chrysotile asbestos fibers (190 g.) were slurried in 5 gallons of water. The above homogeneous solution (555 g.) was added to the asbestos slurry and allowed to stand 18 hours, the pH of the water was 7.9. The fibers remained suspended and the organosilicon solids were deposited onto the fibers. The coated fibers were redispersed by agitation and the dispersion was filtered through a polyvinyl alcohol treated glass scrim cloth which was placed over the screen in a hand sheet paper machine. The silicone-asbestos paper thus formed, was then pressed between blotting paper. Several sheets (8" x 8") of the paper were press-molded together to form a laminate at 500 p.s.i. at 175° C. for 2 hours. The laminate was then post-cured for 4 hours at 250° C. The laminate was 1/16 inch thick and was a strong and well-consolidated laminate. The laminate had an average flexural strength of 16,367 at room temperature and 9,460 at 500° F.

EXAMPLE 2

Monophenyltrimethoxysilane (400 g.) was added to 3 gallons of water which contained 3 g. acetic acid and the solution agitated until it became homogeneous. Canadian chrysotile asbestos fibers (390 g.) were added to the solution. The slurry was allowed to stand 18 hours at which time the organosilicon solids had deposited onto the asbestos fibers. The slurry had a pH of 8.5. The slurry was agitated and then filtered through a Buchner funnel to form a paper with the water being removed by a partial vacuum. The paper was dried for 16 hours at 90° C. There were no solids in the filtrate portion of the slurry. The paper contained 40 percent organosilicon solids. Several sheets of paper were press-molded together to form a laminate at 3000 p.s.i. at 175° C. for one hour and post-cured for 18 hours at 250° C. The temperature was increased from 90° C. to 250° C. at the rate of 5° C. per two hours. The laminate was .5 inch thick and had a flexural strength at room temperature of 9000 and 3500 at 500° F.

EXAMPLE 3

This example demonstrates the effect of shelf aging the paper prior to making a laminate. Canadian chrysotile asbestos fibers (250 g.) were slurried in 3 gallons of water. Monophenyltrimethoxysilane (557 g.) was added to 161 g. of water which contained 3 g. of acetic acid. A 200 g. portion of this homogeneous solution was added to .5 gallon of water and treated with KOH crystals until the solution was slightly alkaline to litmus paper. This solution was added to the asbestos slurry with agitation. This procedure was repeated with two additional portions of the homogeneous solution resulting in a total of 588 g. of the homogeneous solution being added to the asbestos slurry, bringing the total water concentration to 4.5 gallons. The mixture was agitated for 30 minutes and then agitation was discontinued to prevent coagulation of the fibers. The slurry was then allowed to stand for 64 hours without agitating. The slurry was agitated and the coated fibers were removed by filtration on a Buchner funnel to produce a paper. The paper was dried for 2 hours at 110° C. There were no solids in the filtrate. The paper contained about 54.5 percent by weight organosilicon solids.

Four inch square sheets of the paper (110 g.) were press-molded together to form a laminate at 3000 p.s.i. at 175° C. for one hour. The laminate was then post-cured for 12 hours at 250° C. The laminate was well consolidated and had a flexural strength of 7,000 at room temperature and 4100 at 500° F. After 10 months, a ¼" x 4" x 4" molding was made from the remaining paper sheets by press molding as above. The laminate was post-cured for 48 hours at 250° C. (the temperature being increased from 90° C. at the rate of 8° C. per hour). The laminate was well-consilidated and had a flexural strength of 10,167 at room temperature and 4,800 at 500° F.

EXAMPLE 4

Monophenyltrimethoxysilane (600 g.) containing a small amount of silicon-bonded chlorine was added to 165 g. of water and agitated on a paint roller until it became a homogeneous solution. This solution was then cooled and added dropwise over a two hour period to a slurry of 250 g. of Canadian chrysotile asbestos fibers in 5 gallons of water. The slurry was agitated during the addition and was then allowed to stand without agitation for 4 days. The asbestos was coated with organosilicon solids. The slurry was agitated and the coated asbestos removed by filtration in a Buchner funnel to form a paper which was dried for 16 hours at 90° C. Several sheets (about 50 g.) of the paper were pressed together at high pressure at 175° C. for 60 to 90 seconds and removed from the press while hot. A well consolidated transparent laminate was obtained. The laminate contained about 59 percent by weight organosilicon solids. Several other sheets of the paper were milled and 55 g. of the milled material were molded at 3000 p.s.i. at 175° C. for 30 minutes and allowed to cool below 100° C. and then removed from the press. The resulting laminate was well consolidated and was from 125 to 135 mil thick. This molding was post-cured for 12 hours at 250° C. This laminate had a thermal conductivity of $7 \times 10^{-4}$ g. cal. per sec. per square cm. of sample per 0 C.

EXAMPLE 5

Monophenyltrimethoxysilane (97 g.) was added to one quart of water containing .5 g. acetic acid. The mixture was agitated until it became homogeneous. An additional quart of water was added to the homogeneous solution. Treated chrysotile asbestos fibers (30 g.), acid treated anthophyllite fibers (30 g.) and heat cleaned chopped (.25 to .5 inch long) glass fibers (30 g.) were added to the solution with agitation. The pH of the slurry was adjusted to 8 by the addition of 30 percent ammonia and the slurry was allowed to stand unagitated for one hour. The organosilicon solids had deposited onto the fibers. The slurry was then agitated and the coated fibers removed by filtration to produce a paper. The filtrate contained no solids. The paper was dried for two hours at 110° C. Several sheets of the paper were pressed together at 3,000 p.s.i. at 175° C. for one hour to produce a laminate. The laminate contained about 41 percent by weight organosilicon solids. The laminate was post-cured for 12 hours at 250° C. (16° C. rise per hour). The laminate was well consolidated and had a room temperature flexural strength of 8,900.

EXAMPLE 6

Monophenyltrimethoxysilane (9.2 g.) was added to one quart of water which contained .1 percent by weight acetic acid. The solution was agitated until it became homogeneous. The solution contained about 0.6 percent by weight organosilicon solids. Glass flakes (14 g.) were added to the homogeneous solution and the pH adjusted to between 8.5 and 9 by the addition of 30 percent ammonia and allowed to stand 18 hours. The organosilicon solids were deposited onto the glass flakes. The slurry was then agitated and the coated flakes removed by filtration to produce a paper. The paper was dried for one hour at 110° C. A molding was made from several sheets of the paper made in a 2 inch diameter disc mold at 3,000 p.s.i. at 175° C. for 30 minutes. The mold was cooled to about 100° C. and the molded article removed. A well consolidated molded article was obtained. The molded article had a Condition A volume resistivity at $2.8 \times 10^6$ megohms and a Condition A surface resistivity of $1.6 \times 10^{14}$ ohms-cm. The sample had the following dielectric constants and dissipation factors as molded (Condition A).

| Frequency (cycles per sec.) | Dielectric constant | Dissipation factor |
| --- | --- | --- |
| 60 | 4.42 | 0.0048 |
| 1,000 | 4.36 | 0.0030 |
| 1,000,000 | 4.33 | 0.0022 |

Another laminate (30 mils thick) had a dielectric strength of 223.3 volts per mil in air and 653.3 volts per mil in oil.

EXAMPLE 7

Monophenyltrimethoxysilane (33.3 g.) and dimethyldimethoxysilane (6.7 g.) were added to one quart of water which contained 0.1 percent by weight acetic acid. The solution was agitated until it became homogeneous. The solution contained about 2.73 percent by weight organosilicon solids. Mica flakes (40 g.) were added to the homogeneous solution and the pH adjusted to 8.9 by the addition of 30 percent ammonia and allowed to stand unagitated 18 hours. The organosilicon solids were deposited onto the mica flakes. The slurry was then agitated and the coated flakes removed by filtration to produce a paper. There were no solids in the filtrate. The paper was dried for one hour at 110° C. Several sheets were molded in a press at 1000 p.s.i. and 175° C. for 30 minutes. The resulting article was 15 mils thick and had a dielectric strength of 745.3 volts per mil in air and 1386.6 volts per mil in oil.

EXAMPLE 8

Monophenyltrimethoxysilane (15.3 g.) was added to 4 g. of water containing .1 percent acetic acid. The solution became homogeneous after agitation. This solution contained 10 g. of organosilicon solids. This solution was added to a water slurry containing 10 g. of alphacellulose pulp and 640 g. of water. The slurry was allowed to stand 18 hours without agitation. The organosilicon solids were deposited onto the fibers. The slurry was then agitated and the coated fibers were removed by filtration in a Buchner funnel to produce a paper. The filtrate contained .03 percent by weight solids and had a pH of 6.8. The paper was dried for one hour at 110° C. Two sheets were press-molded at 1,000 p.s.i. at 175° C. for 15 minutes to produce a laminate. The laminate was then post-cured 24 hours at 150° C. The laminate was well consolidated and had a thickness of 25 ml.

EXAMPLE 9

A Hollander beater was filled with 400 gallons of water. The pH was lowered to 4.0 with 1200 g. of glacial acetic acid. Monophenyltrimethoxysilane (135 lbs., 73.4 mol percent) was added. The mixture became homogeneous after 1.5 hours of agitation. Phenylmethyldimethoxysilane (45 lbs., 26.6 mol percent) was then added and the mixture became homogeneous after an additional 15 minutes of agitation. The solution was agitatetd for an addtional 30 minutes. Canadian chrysotile asbestos fibers (125 lbs.) were added to the solution. The slurry was agitated for 10 minutes before 200 g. of potassium hydroxide was dissolved in 5 gallons of water and added to the slurry. The slurry was agitated for one minute and allowed to stand 18 hours. The organosilicon solids had precipitaed onto the asbestos fibers. The slurry was then agitated for 10 minutes. The pH at this time was 9.4. The slurry was pumped from the beater to the stock chest of a Fourdrinier paper making machine and diluted to 3.5 percent by weight total solids (asbestos and organosilicon solids). The slurry was fed into the head box and a sheet was formed on the Fourdrinier wire at a head slice opening of about one inch and a wire speed of about 20 to 25 feet/minute. The sheet was about 20 mils thick. The water was removed from the sheet by the suction boxes in the Fourdrinier. This water contained .03 percent by weight organosilicon solids. The sheet was transferred from the Fourdrinier wire to the felt presses. Sheets of asbestos were taken off the felt presses and air dried, pressed at 1000 p.s.i. at 175° C. for one hour, and laminate post-cured 12 hours at 250° C. The laminate was 11.7 mils thick and contained about 50 percent by weight organosilicon solids. The laminate was well consolidated. The dielectric strength of the laminate was 663 volts per mil in air and 798 volts per mil in oil. This sample had an arc resistance of 173 sec. The laminate had the following dielectric constants. The sample tested in accordance with Condition D was immersed in water at 23° C. for 24 hours.

| Frequency (cycles per sec.) | Dielectric constant | |
| --- | --- | --- |
| | Condition A | Condition D |
| 60 | 4.88 | 7.12 |
| 1,000 | 4.07 | 6.06 |
| 1,000,000 | 2.89 | --- |

EXAMPLE 10

190 g. of chrysotile asbestos fibers (.25 in. in length or less) were slurried with four gallons of water. Monophenyltrimethoxysilane (600 g., 3 mol) was mixed with 165 g. water containing 0.1 percent by weight acetic acid. The mixture was shaken until a homogeneous solution was obtained which contained about 49 percent by weight organosilicon solids. 560 g. of this solution was added to the asbestos slurry and agitated for 10 minutes. The slurry was stirred for 10 minutes and allowed to stand without any agitation for three days. At the end of this time the organosilicon solids had precipitated onto the asbestos fibers. The slurry was then agitated. The fibers were then made into a continuous sheet of paper by filtering the slurry over a polyvinyl alcohol finished glass scrim cloth on an 8″ x 8″ hand sheet machine. There were no solids in the filtrate. A 12 foot length of paper was made. The paper was pressed between paper blotters at 30 p.s.i. and allowed to air dry overnight. A 1¼ inch diameter mandrel was heated to 500° F. A tube was made from this paper by winding a sheet of paper around a heated mandrel. Pressure was applied to the sheet by two 4″ diameter rolls which had 100 p.s.i. line pressure. After the tube was formed the tube was rolled for an additional 10 minutes. The tube was then placed in an oven at 500° F. for 4 hours and then cooled. The tube walls were about 124 mils thick and were well consolidated and homogeneous. The surfaces of the tube walls were uniform and smooth. The tube walls had a dielectric strength of 214 volts per mil in oil and 226 volts per mil in air. This tube is suitable for use as a core in a dry type transformer.

EXAMPLE 11

Monophenyltrimethoxysilane (400 g., 75 mol percent) was added to 3.5 gallons of water containing 3 g. of acetic acid. The mixture was agitated until it became homogeneous. Phenylmethyldimethoxysilane (122 g., 25 mol percent was then added. The mixture was agitated until it became homogeneous. Beta-hydroxyethyltrimethylammonium bicarbonate (2 g.) was then added bringing the pH to 5.4. Canadian chrysotile asbestos fibers (650 g.) were then added to the solution. The slurry was allowed to stand unagitated for 2 hours, at that time the pH of the water was 8, and 81.6 percent of the organosilicon composition had deposited on the fibers. Also at this stage the fibers would no longer agglomerate when agitated. The slurry was agitated for five minutes to aid in the deposition of the remaining siloxane. At the end of one hour the slurry was again agitated for five minutes at which time the pH was 8.3. The slurry was then allowed to stand unagitated for 16 hours, at which time the slurry had a pH of 8.9 and 97.5 percent of the organosilicon compound had been deposited on the asbestos. The slurry was agitated for 5 minutes and the coated asbestos removed by filtration to produce a paper which was dried at 110° C. for 2 hours. The filtrate contained .07 percent by weight solids. Several sheets of the paper were press-molded at 3000 p.s.i. at 175° C. for one hour to produce a laminate ⅝ inch thick. This laminate was post-cured for 72 hours at 250° C. (the temperature being raised 20° C. every 2 hours from 200 C.). The laminate contained about 35 percent by weight organosilicon solids. The laminate was well consolidated and had a flexural strength at room temperature of 10,800.

EXAMPLE 12

Monophenyltrimethoxysilane (400 g., 84 mol percent) and 70 g. of phenylmethyldimethoxysilane (16 mol percent) were added to 4 gallons of water containing 3 g. of acetic acid. The mixture was agitated until it became homogeneous. Canadian chrysotile asbestos fibers (727 g.) were then added to the solution. The slurry was then allowed to stand for 16 hours at which time the pH was 8.5 The organosilicon solids were deposited onto the fibers. The slurry was agitated and the coated fibers removed by filtration to produce a paper. The paper was dried at 110° C. until a constant weight was obtained. A laminate was prepared by pressing several sheets of the paper together at 1,000 p.s.i. at 175° C. for one hour. The laminate contained 30 percent by weight organosilicon solids. The laminate was post-cured for 12 hours at 250° C. (the temperature rise was 16° C. per hour). The laminate was well consolidated and had a room temperature flexural strength of 8670 and flexural strength of 3100 at 500° F.

EXAMPLE 13

In this example the effect that pH and time has upon the precipitation of organosilicon solids onto asbestos fibers is demonstrated. 200 g. of monophenyltrimethoxysilane was added to 54 g. of deionized water which contained 0.5 g. acetic acid. The mixture was agitated until it became homogeneous. 10 g. portions of this solution (5.14 g. of organosilicon solids) were added (30 minutes after the homogeneous solution was prepared) to a slurry which contained 5 g. of treated chysotile asbestos fibers in 500 g. of water. Additional acetic acid was added in the amount stated in Table I to obtain the desired pH. Each of the slurries contained 1.025 percent by weight organosilicon solids. The percent by weight organosilicon solids in the filtrate portion of each slurry was determined at the intervals stated in Table I. The percent of the total organosilicon solids which was deposited onto the fibers was also determined.

*Table I*

| Sample | pH | Grams of acetic acid added to slurry | One hour | | Three hours | | Twenty-four hours | |
|---|---|---|---|---|---|---|---|---|
| | | | Percent by wt. organosilicon solids in filtrate | Percent of the organosilicon solids on fibers | Percent by wt. organosilicon solids in filtrate | Percent of the organosilicon solids on fibers | Percent by wt. organosilicon solids in filtrate | Percent of the organosilicon solids on fibers |
| 1 | 7.4 | None | 0.36 | 65 | 0.13 | 87.3 | 0.0 | 100 |
| 2 | 7.1 | 0.04 | 0.67 | 35 | 0.33 | 67.6 | 0.07 | 93.2 |
| 3 | 6.4 | 0.10 | 0.93 | 10 | 0.82 | 20.0 | 0.20 | 80.5 |
| 4 | 5.5 | 0.20 | 0.92 | 10 | 0.83 | 10 | 0.60 | 41.5 |
| 5 | 4.5 | 0.50 | 1.02 | 1 | 0.98 | 5 | 0.93 | 10.0 |

The above procedure was repeated except that .054 g. of acetic acid was substituted for .5 g. of acetic acid in the preparation of the homogeneous solution. The homogeneous solution was added to the asbestos slurry 15 minutes after it was prepared. The results are set forth in Table II.

*Table II*

| Sample | pH | Grams of acetic acid added to slurry | One hour | | Three hours | | Twenty-four hours | |
|---|---|---|---|---|---|---|---|---|
| | | | Percent by wt. organosilicon solids in filtrate | Percent of the organosilicon solids on fibers | Percent by wt. organosilicon solids in filtrate | Percent of the organosilicon solids on fibers | Percent by wt. organosilicon solids in filtrate | Percent of the organosilicon solids on fibers |
| 1 | 7.9 | None | 0.19 | 81.5 | 0.16 | 94.4 | 0.04 | 96.1 |
| 2 | 8.0 | 0.04 | 0.36 | 64.8 | 0.29 | 71.7 | 0.07 | 93.2 |
| 3 | 7.7 | 0.10 | 0.49 | 52.2 | 0.52 | 48.2 | 0.17 | 83.4 |
| 4 | 6.1 | 0.20 | 0.98 | 4.5 | 0.99 | 3.4 | 0.89 | 13 |
| 5 | 5.0 | 0.50 | 0.93 | 9.3 | 0.94 | 8.2 | 0.95 | 7.4 |

The procedure used in Table II was repeated except that the homogenous solution was added to the asbestos slurry 24 hours after it was prepared. The results are set forth in Table III.

*Table III*

| Sample | pH | Grams of acetic acid added to slurry | Percent by wt. organosilicon solids in filtrate | | | | Percent of the organosilicon solids on fibers | | | |
|---|---|---|---|---|---|---|---|---|---|---|
| | | | 1 hr. | 2 hrs. | 4 hrs. | 48 hrs. | 1 hr. | 2 hrs. | 4 hrs. | 48 hrs. |
| 1 | 8.6 | None | 0.20 | 0.07 | 0.0 | 0.0 | 80.5 | 93.2 | 100 | 100 |
| 2 | 8.3 | 0.04 | 0.40 | 0.30 | 0.0 | 0.0 | 61 | 70.7 | 100 | 100 |
| 3 | 7.3 | 0.10 | 0.72 | 0.66 | 0.4 | 0.06 | 30 | 35.6 | 61 | 95.2 |
| 4 | 6.0 | 0.20 | 0.86 | 0.93 | 0.6 | 0.33 | 16 | 9.2 | 41.5 | 67.6 |
| 5 | 5.0 | 0.50 | 0.90 | 0.93 | 0.88 | 0.67 | 12 | 9.2 | 14 | 34.6 |

EXAMPLE 14

400 g. of monophenyltrimethoxysilane (84 mol percent) and 70 g. phenylmethyldimethoxysilane (16 mol percent) were added to 3 gallons of water containing 3 g. acetic acid. The mixture was agitated until it became homogeneous. Candian chrysotile asbestos fibers (1,250 g.) was then added to the solution while agitating. The slurry was allowed to stand without agitation for 18 hours. The asbestos was coated with organosilicon solids and the slurry had a pH of 8.3. The slurry was then agitated and the coated asbestos fibers removed by filtration to produce a paper which was dried for 2 hours at 110° C. The paper contained 20 percent by weight organosilicon solids. The filtrate contained .065 percent by weight solids. Sheets of paper were pressed together at 3,000 p.s.i. at 175° C. for one hour to produce a laminate. The laminate was then post-cured for 18 hours at 250° C. (the temperature rise being 5° C. per 2 hours). This laminate was then fired for 18 hours at 1,000° C. to produce a ceramic article. This ceramic article had a room temperature flexural strength of 8,830 and 500° F. flexural strength of 8,170.

EXAMPLE 15

400 g. of monophenyltrimethoxysilane (75 mol percent) was added to 3.75 gallons of water containing 3 g. acetic acid (pH 4.2). The mixture was agitated until it became homogeneous. 80 g. of dimethyldimethoxysilane (25 mol percent) was then added and the mixture agitated until it became homogeneous. Canadian chrysotile asbestos fibers (460 g.) were then added to the solution. The slurry was agitated during the addition and then allowed to stand without agitation for 6 hours. At this point the pH was 8.1 and 85% of the organosilicon compound had been deposited on the fibers. The fibers no longer agglomerated on agitation. The slurry was agitated for 5 minutes and allowed to stand without agitation for 16 hours. 94 percent of the organosilicon composition was deposited on the fibers and the water had a pH of 8.5. The slurry was then agitated and the coated fibers removed by filtration to produce a paper. The filtrate contained .1 percent by weight solids. The paper contained 40 percent by weight organosilicon solids. The paper was dried for 2 hours at 110° C. Several sheets of the paper were pressed together at 3,000 p.s.i. at 175° C. for one hour to produce a laminate. The laminate was then post-cured for 12 hours at 250° C. The laminate was well consolidated and had a flexural strength at room temperature of 10,400 and 5,500 flexural strength at 500° F. The laminate was .5 inch thick.

EXAMPLE 16

Monophenyltrimethoxysilane (400 g., 75 mol percent) and dimethyldimethoxysilane (80 g., 25 mol percent) were added to 3 gallons of water containing 3 g. acetic acid. The mixture was agitated until it became homogeneous. Canadian chrysotile asbestos fibers (720 g.) were then added to the solution with agitation. The slurry was then allowed to stand without agitation for 16 hours at which time the slurry had a pH of 8.2. The organosilicon solids had deposited onto the asbestos fibers. The slurry was then agitated and the coated fibers removed by filtration to produce a paper. The filtrate contained .06 percent by weight solids. The paper was dried for 3 hours at 110° C. Several sheets of the paper were pressed together at 3,000 p.s.i at 175° C. for 3 hours to produce a laminate. The laminate contained 30 percent by weight organosilicon solids. The laminate was then post-cured for 18 hours at 250° C. (the temperature being increased 5° C. per 2 hours). This laminate was well consolidated and had a room temperature flexural strength of 5,360 and a flexural strength of 4,838 at 500° F. The laminate was .5 inch thick.

EXAMPLE 17

An excellent paper is obtained when any of the following fibers are substituted for the mica flakes of Example 6 and the procedure of Example 6 is followed:

A—nylon fibers
B—Dacron fibers
C—Orlon fibers.

EXAMPLE 18

100 g. of phenylmethyldimethoxysilane was hydrolyzed to give a hydroxyl endblocked phenylmethylsiloxane fluid. The fluid was dissolved in acetone and mixed with 30 g. of acid washed asbestos fibers and 30 g. of heat cleaned chopped glass fibers. The acetone was allowed to evaporate leaving all of the fluid dispersed on the asbestos and glass. The coated fibers were then mixed with a solution formed by mixing 100 g. of phenyltrimethoxysilane with 1400 g. of water. Beta-hydroxyethyltrimethylammonium bicarbonate was added to bring the pH to 8 and the slurry was allowed to stand three days. The coated fibers would not coagulate when agitated. The fibers were filtered to give a sheet of paper which was dried 3 hours at 110° C. The sheets were cut up and laminated and molded at 1000 p.s.i. for one hour and cooled to give a consolidated laminate in which the siloxane was 52.4 mol percent phenylmethylsiloxane and 47.6 mol percent monophenylsiloxane.

That which is claimed is:

The method for preparing paper which consists essentially of (1) mixing sheetable particulated mica flakes with a water solution of an organosilicon composition in which the organosilyl units consists essentially of from 70 to 100 mol percent $C_6H_5Si\equiv$ units, essentially all of any remaining organosilyl units being selected from the group consisting of units of the formulae $(C_6H_5)(CH_3)Si=$ and $(CH_3)_2Si=$, essentially all the remaining valences of the silicon atom in the said organosilicon composition being satisfied by oxygen in the form of a configuration of the group consisting of OH groups and SiOSi linkages, the pH of the aqueous solution during at least a portion of the period of contact with the mica flakes being at least 7.5 so that at least 5 percent by weight based upon the weight of the mica flakes of the organosilicon composition in the solution is deposited onto the sheetable particulated mica flakes.

(2) allowing the coated mica flakes to stand without agitation for a time sufficient that they will not coagulate when they are agitated,
(3) thereafter agitating the mixture to redisperse the mica flakes in the water, and
(4) separating the mica flakes from the water in such a manner that the mica flakes are bound together to form a sheet.

References Cited by the Examiner

UNITED STATES PATENTS

| | | | |
|---|---|---|---|
| 1,572,847 | 2/1926 | Parker | 162—118 |
| 2,646,373 | 7/1953 | MacMullen et al. | 162—158 |
| 2,680,073 | 6/1954 | Davidson et al. | 162—158 |
| 2,718,475 | 9/1955 | Radke et al. | |
| 2,772,157 | 11/1956 | Cilley et al. | 162—145 |

FOREIGN PATENTS

| | | |
|---|---|---|
| 991,088 | 6/1951 | France. |
| 1,128,269 | 8/1956 | France |

OTHER REFERENCES

Bergendahl et al.: "Beater Sizing With the Silicones," Paper Trade Journal, vol. 125, No. 10, 1947, pp. 40–48.

DONALL H. SYLVESTER, *Primary Examiner.*

MORRIS O. WOLK, *Examiner.*